2,496,928

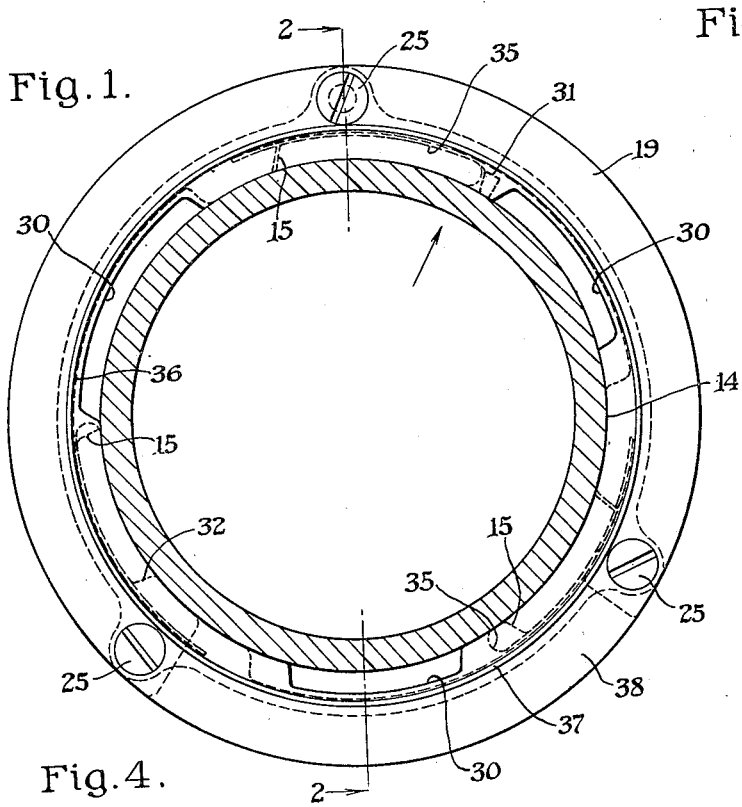
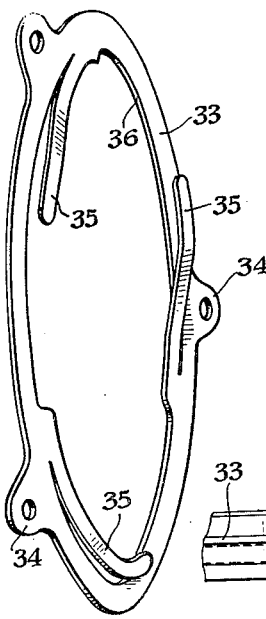
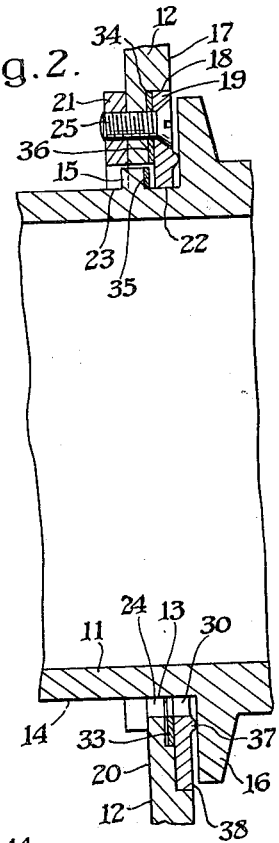
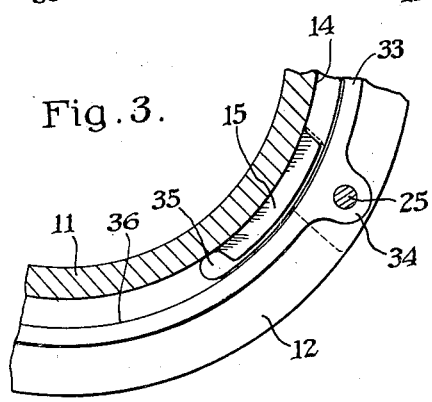
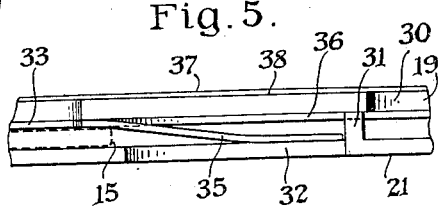
Herbert A. Bing
Bernard J. Wolfe
INVENTORS Patented Feb. 7, 1950

UNITED STATES PATENT OFFICE 2,496,928

BAYONET LOCK

Herbert A. Bing and Bernard J. Wolfe, Rochester, N. Y., assignors to Eastman Kodak Company, Rochester, N. Y., a corporation of New Jersey Application December 6, 1947, Serial No. 790,058

18 Claims. (Cl. 285—177)

The present invention relates to an attaching means, and more particularly to an attaching means of the bayonet-lock type primarily intended for use in connection with a lens mount, but adapted for a wide range of other uses.

Bayonet locks, per se, are broadly old and usually comprise a plurality of spaced radial lugs formed on a cylindrical member or mount and adapted to be passed axially through similarly shaped and spaced slots on a mounting member or support and into an annular groove formed on the latter. The mount is then rotated relative to the support to move the lugs out of registry with the slots. When the mount has been rotated to a definite position, pivoted members or latches on the support engage pins or similar elements on the mount to lock the latter releasably in position. Such latches constitute additional elements which are usually manually released to disengage the mount. Also, in many structures, no means is provided for accurately positioning the mount axially.

The present invention overcomes these difficulties by providing a new, improved and simplified bayonet-lock construction which securely but releasably retains the mount in position on the support. The mount is moved automatically to locked position upon rotation of the mount on the support. Also, release of the mount is secured by a mere reverse rotation of the mount, thus eliminating manually-releasable catches or similar devices. Also, means cooperates with the bayonet-lock to position the mount axially on its support to insure the cooperating relation of the locking means.

The present invention has, therefore, as its principal object, the provision of a new and improved form of bayonet-lock.

A still further object of the invention is the provision of a novel form of releasable locking means.

Still another object of the invention is the provision of a positioning means which accurately positions the locking parts axially, retaining such parts in locking relation.

Yet another object of the invention is the provision of a new and improved bayonet-lock which is simple, rugged, easy to operate, and positive in its action.

To these and other ends, the invention resides in certain improvements and combinations of parts, all as will be hereinafter more fully described, the novel features being pointed out in claims at the end of the specification.

In the drawings:

Fig. 1 is a front view of a support and lens mount, with the latter in section, showing a bayonet-lock constructed in accordance with the present invention;

Fig. 2 is a vertical sectional view through the mount and support illustrated in Fig. 1, and taken substantially on line 2—2 thereof, showing the relation of the parts of the bayonet-lock and the mount positioning means of the present invention;

Fig. 3 is a partial front view, with the mount in section, showing the relation of the lugs on the mount to the moving or positioning springs;

Fig. 4 is a perspective view of a lug moving or positioning spring; and

Fig. 5 is a partial view of the mount looking in the direction of the arrow, Fig. 1, showing the means for limiting the rotation of the mount on the support to position the lugs in registration with the locking slots.

The drawings show a new, improved, and simplified attaching means of the bayonet-lock type for releasably locking or securing a cylindrical tubular sleeve 11, in the form of a cylindrical lens mount, on a support or plate 12 which, in the present instance, comprises a flat plate provided with a central cylindrical opening 13. The mount may have positioned therein a lens system, not shown. The outer periphery 14 of the lens mount is provided with a plurality of, in the present instance three, radially projecting and peripherally spaced lugs 15 which are of different size, for a purpose to be later described. An annular rib or flange 16 projects radially from the periphery 14 and is spaced axially and is of a larger diameter than the lugs 15, as clearly shown in Fig. 2.

The front face 17 of the supporting plate 12 is provided with an annular recessed portion 18, adjacent opening 13, in which is positioned an annular plate 19. The rear face 20 of the plate 11 has arranged in contact therewith a second annular plate 21. The plates 19 and 21 are formed with aligned central openings 22 and 23, respectively, of equal diameter but of a diameter less than that of the opening 13 to provide a peripheral groove 24, the bottom of which is formed by the periphery of the opening 13, as best shown in Fig. 2. The diameters of the openings 22 and 23 are such as to slidably receive the periphery 14 of the tube 11, while the groove 24 is of a width substantially equal to the thickness of the lugs 15, all as shown in Fig. 2.

Screws 25 extend through registering openings in the front plate 19 and the supporting plate 12 and are received in registering threaded openings in the rear plate 21 to hold the plates 19 and 21 securely in place on the supporting plate 12, as clearly illustrated in Fig. 2. The plates 19 and 21 form an adaptor which may be secured to the supporting plate 12 to provide means which cooperate with the lugs 15 to secure the sleeve or mount 11 releasably in position on the supporting plate 12. As the plates 19 and 21 are rigidly secured to the plate 12, they form, in effect, a unitary structure therewith so that the plate 12 may be broadly considered as provided with a central aperture adapted to receive the sleeve 11 and a peripheral groove 24 in which the lugs 15 are movable, the plates 19 and 21 forming the sides of the groove, as will be readily apparent from an inspection of Fig. 2. However, for manufacturing reasons, it is desirable to form the plates 19 and 21 as separate elements and then attach these plates to the supporting plate 12 in the manner and positions shown in Fig. 2.

The front plate 19 has formed therein a plurality of, in the present instance three, open ended slots 30 which extend through the plate to communicate with groove 24. The slots 30 are spaced in accordance with and are the same sizes as the various lugs 15. As the latter are different size, they can pass through the slots 30 only when the mount 11 is in a definite position relative to the plate 12. By thus making the lugs 15, as well as the slots 30, different sizes, the mount 11 can be assembled on the plate 12 only in one position. This is particularly desirable in connection with lens mounts so as to insure that the focusing scales and the various operating levers or handles will be in the proper positions, as will be readily apparent to those familiar with such structures.

In order to attach the mount 11, the latter is slid through the apertures 22 and 23 of plates 19 and 21 until the lugs 15 approach the front plate 19; thereupon the mount 11 is rotated to bring the various lugs into registry with the similarly shaped slots 30. Then the mount is slid axially to move the lugs 15 through the slots 30 and into the groove 24. A rotative movement of the mount 11 relative to the plate 12 then serves to move the lugs 15 out of registry with the slots 30, as will be readily understood by those familiar with such bayonet-type locks. Rotation of mount 11 is continued until one of the lugs 15 finally engages a stop member 31 in the form of a finger formed from the material of the rear plate 21 and bent normal thereto so as to extend across groove 24 and in the path of said one lug.

Upon engagement of the one lug 15 with the limiting finger or stop 31, the lugs 15 are then automatically brought into registry with a group of open-end slots 32 formed in the rear plate 21. This second group of slots are spaced and shaped similarly to the slots 30, but are positioned circumferentially about a quarter of a turn from the slots 30 so as to be positioned out of axial registration therewith. When the lugs 15 are then brought into registration in the slots 32, the mount 11 is moved or shifted axially to position the lugs 15 in the slots 32 to lock the mount 11 releasably to the plate 12. Thus the mount 11 is releasably secured to plate 12 by means of an axial movement to pass the lugs first through the slots 30 of plate 19, and then rotating the mount 11 to shift the lugs 15 along groove 24 and out of registry with the slots 30 and finally into registry with the slots 32, and then a second axial movement to shift the lugs 15 out of the groove 24 into the slots 32.

In order to move the lugs 15 axially out of groove 24 into the registering slots 32, the present invention provides an annular member 33 formed with spaced apertured bosses 34 through which the screws 25 extend to hold and retain the member 33 in position between the front plate 19 and the bottom of the recess 18, as clearly shown in Fig. 2. The annular member 33 is provided with a plurality of, in the present instance three, cantilever springs 35 which are bent out of the plane of the member 33 and extend toward the back plate 21 between the slots 30, as best shown in Fig. 5. The inner edges 36 of the member 33 intermediate the springs 35 have a diameter slightly greater than the slots 30 to permit the free passage of the lugs 15 through the slots 30 and into the groove 24. As the mount 11 is rotated, the lugs 15 slide in the groove 24 and along the springs 35, between the latter and the rear plate 21 (see Fig. 5). Continued rotation of the mount causes the lugs 15 to gradually press the springs toward the plate 19, or upwardly as viewed in Fig. 5, and toward the plane of the member 33. This bending of the springs 35 flexes or tensions the latter so that when the lugs 15 finally register with the slots 32 of plate 21, the springs are fully tensioned so as to shift the lugs 15 axially out of the groove 24 and into the registering slots 32. This movement also serves to shift the entire mount 11 axially to bring the flange 16 finally into engagement with an annular rib or bead 37 formed on the front face 38 of the plate 19 to position the entire mount 11 axially and to bring the lugs 15 into the slots 32. The bead 37 forms a high pressure seat which accurately locates the mount axially.

In addition to moving the lugs 15 from the groove 24 into the slots 32, the springs 35 also serve to hold the lugs yieldably in position in these slots to secure the mount 11 detachably to the supporting plate 12. When it is desired to disconnect the mount, the latter is grasped and moved forwardly axially against the action of the springs 35 to move the lugs 15 out of the slots 32 and into registry with the groove 24. A reverse rotation of the mount 11 then serves to move the lugs 15 along the groove 24 out of registry with the slots 32 and finally into registry with the slots 30. Whereupon, a further forward axial movement will draw the lugs 15 through the slots 30 to disconnect the mount 11.

In the preferred arrangement, the flange or rib 16 engages and cooperates with the bead 37 to limit the rearward movement of the mount 11 and thus position accurately the latter axially relative to the supporting plate 12. Also in the preferred arrangement the slots 30 and 32 pass entirely through the plates 19 and 21, respectively. However, it is contemplated that the rear plate 21 may be made of a thickness greater than the thickness of the lugs 15, and the slots 32 may be of a depth less than the thickness of the plate to form recesses of such a depth as to receive the lugs 15. With such an arrangement, when the lugs 15 are pushed axially into the recess of the plate 21 by springs 35, the lugs 15 will engage the bottoms of the recesses to limit further axial movement of the lugs to position the latter, as well as the entire mount, axially. With such an arrangement, the cooperating flange and bead arrangement may be eliminated.

It will be apparent from the above description that the present invention provides a new and improved form of a bayonet lock which both releasably secures the mount on the support and accurately positions the mount thereon. The improved form of bayonet lock is simple, rugged, easy to operate, and highly effective in use.

While one embodiment of the invention has been disclosed, it is to be understood that the inventive idea may be carried out in a number of ways. This application is, therefore, not to be limited to the precise details disclosed, but is intended to cover all variations and modifications thereof falling within the scope of the appended claims.

Having thus described our invention, what we claim is:

1. A bayonet lock comprising, in combination, a support formed with a cylindrical opening the periphery of which is provided with an annular groove, said support also having separate axially-spaced groups of open-end slots communicating with said groove, said groups being out of registry, a cylindrical member positionable in said opening, a plurality of radially extending lugs formed on said member and adapted to be passed axially through one of said groups of slots and into said groove, said member being rotatable relative to said support to move said lugs in said groove and out of registry with said one group of slots and into registry with and into the other group of slots, and means to retain said lugs yieldably in said other group of slots to lock said member releasably to said support.

2. A bayonet lock comprising, in combination, a support formed with a cylindrical opening the periphery of which is provided with an annular groove, said support also having separate axially-spaced groups of open-end slots communicating with said groove, said groups being out of registry, a cylindrical member positionable in said opening, a plurality of radially extending lugs formed on said member and adapted to be passed axially through one of said groups of slots and into said groove, said member being rotatable relative to said support to move said lugs in said groove and out of registry with said one group of slots, means to limit the rotation of said member to position said lugs in registry with the other group of slots to permit the lugs to move thereinto, and means for retaining said lugs yieldably in said second group of slots to lock said member releasably to said support.

3. A bayonet lock comprising, in combination, a support formed with a cylindrical opening the periphery of which is provided with an annular groove, said support also having separate axially-spaced groups of open-end slots communicating with said groove, said groups being out of registry, a cylindrical member positionable in said opening, a plurality of radially extending lugs formed on said member and adapted to be passed axially through one of said groups of slots and into said groove, said member being rotatable relative to said support to move said lugs in said groove and out of registry with said one group of slots, means positioned in said groove and engageable by at least one of said lugs to limit the rotative movement of said lugs in said groove and to position the lugs in registry with the other group of slots for movement thereinto, and means engaging said lugs to hold the latter yieldably in said other group of slots to lock the member releasably to said support.

4. A bayonet lock comprising, in combination, a support formed with a cylindrical opening the periphery of which is provided with an annular groove, said support also having separate axially-spaced groups of open-end slots communicating with said groove, said groups being out of axial registry, a cylindrical member positionable in said opening, a plurality of radially extending lugs formed on said member and adapted to be passed axially through one of said groups of slots and into said groove, said member being rotatable relative to said support to move said lugs in said groove and out of registry with said one group of slots, a finger extending across said groove adjacent one of the slots of said other group and engageable by one of said lugs to limit the movement of the latter in said groove to position said lugs in registry with the other group of lugs so that said member may be moved axially to position said lugs in said other group of slots, and means carried by said support and engaging said lugs to retain the latter yieldably in said other group of slots to lock said member releasably in position on said support.

5. A bayonet lock comprising, in combination, a support formed with a cylindrical opening the periphery of which is provided with an annular groove, said support also having separate axially-spaced groups of open-end slots communicating with said groove, said groups being out of axial registry, a cylindrical member positionable in said opening, a plurality of radially extending lugs formed on said member and adapted to be passed axially through one of said groups of slots and into said groove, said member being rotatable relative to said support to move said lugs in said groove and out of registry with said one group of slots and into registry with the other group of slots, and means to shift said lugs axially out of said groove and into said other group of slots to connect said member releasably to said support.

6. A bayonet lock comprising, in combination, a support formed with a cylindrical opening the periphery of which is provided with an annular groove, said support also having separate axially-spaced groups of open-end slots communicating with said groove, said groups being out of registry, a cylindrical member positionable in said opening, a plurality of radially extending lugs formed on said member and adapted to be passed axially through one of said groups of slots and into said groove, said member being rotatable relative to said support to move said lugs in said groove and out of registry with said one group of slots and into registry with the other group of slots, means to shift said lugs axially out of said groove and into said other group of slots, and means engaging said lug to retain the latter yieldably in position in said other group of slots to lock said member releasably in position on said support.

7. A bayonet lock comprising, in combination, a support formed with a cylindrical opening the periphery of which is provided with an annular groove, said support also having separate axially-spaced groups of open-end slots communicating with said groove, said groups being out of registry, a cylindrical member positionable in said opening, a plurality of radially extending lugs formed on said member and adapted to be passed axially through one of said groups of slots and into said groove, said member being rotatable relative to said support to move said lugs in said groove and out of registry with said one group of slots and into registry with the other group of slots, and spring means positioned in said groove and engaging said lug to move the latter from said groove and into said other group of slots and to hold the lugs therein yieldably lock said member releasably to said support.

8. A bayonet lock comprising, in combination, a support formed with a cylindrical opening the periphery of which is provided with an annular grove, said support also having separate axially-spaced groups of open-end slots communicating with said groove, said groups being out of registry, a cylindrical member positionable in said opening, a plurality of radially extending lugs formed on said member and adapted to be passed axially through one of said groups of slots and into said groove, said member being rotatable relative to said support to move said lugs in said groove and out of registry with said one group of slots, means to limit the rotation of said member to position said lugs in registry with the other group of slots to permit the lugs to move thereinto, and mean to shift said lugs axially out of said groove and into said other group of slots to connect said member releasably to said support.

9. A bayonet lock comprising, in combination, a support formed with a cylindrical opening the periphery of which is provided with an annular groove, said support also having separate axially-spaced groups of open-end slots communicating with said groove, said groups being out of registry, a cylindrical member positionable in said opening, a plurality of radially extending lugs formed on said member and adapted to be passed axially through one of said groups of slots and into said groove, said member being rotatable relative to said support to move said lugs in said groove and out of registry with said one group of slots, means to limit the rotation of said member to position said lugs in registry with the other group of slots to permit the lugs to move thereinto, means to shift said lugs axially out of said groove and into said other group of slots to connect said member releasably to said support, and means engaging said lugs to retain the latter in position in said other group of slots to lock said member releasably to said support.

10. A bayonet lock comprising, in combination, a support formed with a cylindrical opening the periphery of which is provided with an annular groove, said support also having separate axially-spaced groups of open-end slots communicating with said groove, said groups being out of registry, a cylindrical member positionable in said opening, a plurality of radially extending lugs formed on said member and adapted to be passed axially through one of said groups of slots and into said groove, said member being rotatable relative to said support to move said lugs in said groove and out of registry with said one group of slots, means positioned in said groove and engageable by at least one of said lugs to limit the rotative movement of said lugs in said groove and to position the lugs in registry with the other group of slots, and a spring member positioned in said groove and tensioned by the rotation of said lugs to move the latter axially into said other group of slots when positioned in registry therewith and to hold said lugs yieldably in said other group of slots to lock said member releasably to said support.

11. A bayonet lock comprising, in combination, a support formed with a cylindrical opening the periphery of which is provided with an annular groove, said support also having separate axially-spaced groups of open-end slots communicating with said groove, said groups being out of registry, a cylindrical member positionable in said opening, a plurality of radially extending lugs formed on said member and adapted to be passed axially through one of said groups of slots and into said groove, said member being rotatable relative to said support to move said lugs in said groove and out of registry with said one group of slots, means positioned in said groove and engageable by at least one of said lugs to limit the rotative movement of said lugs in said groove and to position the lugs in registry with the other group of slots, an annular member positioned in said groove, and a plurality of cantilever spring members formed from said annular member and terminating adjacent said other group of slots, said spring member extending across said groove and being engageable and flexed by said lugs as the latter are moved in said groove to tension said spring member to render the latter effective to shift said lugs axially from said groove and into said other group of slots when positioned in registry therewith and to hold said lugs yieldably in said other group of slots to lock said first member releasably to said support.

12. A bayonet lock comprising, in combination, a support formed with a cylindrical opening the periphery of which is provided with an annular groove, said support also having separate axially-spaced groups of open-end slots communicating with said groove, said groups being out of registry, a cylindrical member positionable in said opening, a plurality of radially extending lugs formed on said member and adapted to be passed axially through one of said groups of slots and into said groove, said member being rotatable relative to said support to move said lugs in said groove and out of registry with said one group of slots and into registry with and into the other group of slots, means to retain said lugs yieldably in said other group of slots to lock said member releasably to said support, and cooperating means on said support and cylindrical member to limit the axial movement of said member to position said lugs in said other groups of slots.

13. A bayonet lock comprising, in combination, a support formed with a cylindrical opening, an adaptor secured to said support and formed with a central opening concentric with but smaller than said first opening and cooperating therewith to form an annular groove having axially-spaced sides, a cylindrical member slidable in the opening of said adaptor, each of said sides being formed with a plurality of peripherally-spaced slots communicating with said groove, a plurality of radially-extending lugs formed on said member and adapted to pass axially through the slots in one of said sides and into said groove, the slots in said other side being out of registry with the slots in said one side, said member being rotatable relative to said support to move said lugs out of registry with the slots in said one side and along said groove and into registry with the slots in the other side, and means for moving said lugs out of said groove and into the slots of said other side to hold the lugs yieldably therein to lock said member releasably to said support.

14. A bayonet lock comprising, in combination, a support formed with a cylindrical opening, an adaptor secured to said support and formed with a central opening concentric with but smaller than said first opening and cooperating therewith to form an annular groove having axially-spaced sides, a cylindrical member slidable in the opening of said adaptor, each of said sides being formed with a plurality of peripherally-spaced slots communicating with said groove, a plurality of radially-extending lugs formed on said member and adapted to pass axially through the slots in one of said sides and into said groove, the slots in said other side being out of registry with the slots in said one side, said member being rotatable relative to said support to move said lugs out of registry with the slots in said one side and along said groove, means in said groove and positioned in the path of at least one of said lugs to limit the rotative movement of said lugs in said groove to position said lugs in registry with the slots in said other side, and spring means positioned in said groove for axially moving said lugs out of said groove and into the slots of said other side and to retain the lugs yieldably therein to lock said member releasably to said support.

15. A bayonet lock comprising, in combination, a support in the form of a plate provided with a circular opening, an adaptor comprising annular members secured in spaced relation on opposite sides of said plate and formed with aligned circular apertures of a less diameter than said opening and cooperating therewith to form an annular groove positioned between said members, a tubular sleeve positionable in said apertures, radially projecting lugs formed on said sleeve, one of said members being formed with a group of slots extending therethrough, said lugs being axially movable through said slots and into said groove and rotatable in the latter and out of registry with said slots, said other member having a group of slots extending therethrough and out of registry with said first group of slots, said lugs being movable in said groove and into registry with said second group of slots and then movable axially into the latter, and means engaging said lugs to hold the latter yieldably in said second group of slots to lock said sleeve releasably to said plate.

16. A bayonet lock comprising, in combination, a support in the form of a plate provided with a circular opening, an adaptor comprising annular members secured in spaced relation on opposite sides of said plate and formed with aligned circular apertures of a less diameter than said opening and cooperating therewith to form an annular groove positioned between said members, a tubular sleeve positionable in said apertures, radially projecting lugs formed on said sleeve, one of said members being formed with a group of slots extending therethrough, said lugs being axially movable through said slots and into said groove and rotatable in the later and out of registry with said slots, said other member having a group of slots extending therethrough and out of registry with said first group of slots, means formed in one of said members and extending across said groove in the path of one of said lugs to be engaged by the latter to limit the movement of said lugs in said groove to position the lugs in registry with said second group of slots, means for axially moving said lugs out of said groove and into said second group of slots, and means for retaining said lugs yieldably in said second group of slots to lock said sleeve releasably to said plate.

17. A bayonet lock comprising, in combination, a support formed with a cylindrical opening, an adaptor secured to said support and formed with a central opening concentric with but smaller than said first opening and cooperating therewith to form an annular groove having axially-spaced sides, a cylindrical member slidable in the opening of said adaptor, each of said sides being formed with a plurality of peripherally-spaced slots communicating with said groove, a plurality of radially-extending lugs formed on said member and adapted to pass axially through the slots in one of said sides and into said groove, the slots in said other side being out of registry with the slots in said one side, said member being rotatable relative to said support to move said lugs out of registry with the slots in said one side and along said groove and into registry with the slots in the other side, means for moving said lugs out of said groove and into the slots of said other side and to hold the lugs yieldably therein to lock said member releasably to said support, and cooperating means on said support and adaptor for limiting the axial movement of said member to position the latter on said support.

18. A bayonet lock comprising, in combination, a support in the form of a plate provided with a circular opening, an adaptor comprising annular members secured in spaced relation on opposite sides of said plate and formed with aligned circular apertures of a less diameter than said opening and cooperating therewith to form an annular groove positioned between said members, a tubular sleeve positionable in said apertures, radially projecting lugs formed on said sleeve, one of said members being formed with a group a slots extending therethrough, said lugs being axially movable through said slots and into said groove and rotatable in the latter and out of registry with said slots, said other member having a group of slots extending therethrough and out of registry with said first group of slots, an annular member positioned in said groove, spring members formed from the material of said annular member and bent out of the plane thereof to extend across said groove and in the path of said lugs, the movement of the latter along said groove serving to press said spring member toward the plane of said annular member to tension said spring members, means for limiting the movement of said lugs in said groove to position said lugs in registry with said second group of slots, said tensioned springs serving to move said lugs axially out of said groove and into said second group of slots, and means for limiting said axial movement to position said lugs in said second group of slots, said spring also serving to hold said lugs yieldably in said last-mentioned slots to connect the sleeve releasably to said support.

HERBERT A. BING.
BERNARD J. WOLFE.

No references cited.